US012276453B2

(12) United States Patent
Lee et al.

(10) Patent No.: US 12,276,453 B2
(45) Date of Patent: Apr. 15, 2025

(54) REFRIGERATOR

(71) Applicant: Samsung Electronics Co., Ltd., Suwon-si (KR)

(72) Inventors: Sangho Lee, Suwon-si (KR); Changhyun Park, Suwon-si (KR); Suho Jo, Suwon-si (KR); Byoungmok Kim, Suwon-si (KR); Jonghyun Son, Suwon-si (KR); Bongkeun Lim, Suwon-si (KR); Jaeyeon Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 91 days.

(21) Appl. No.: 18/310,883

(22) Filed: May 2, 2023

(65) Prior Publication Data

US 2023/0272968 A1 Aug. 31, 2023

Related U.S. Application Data

(63) Continuation of application No. PCT/KR2021/017462, filed on Nov. 25, 2021.

(30) Foreign Application Priority Data

Jan. 18, 2021 (KR) ........................ 10-2021-0006840

(51) Int. Cl.
*F25D 23/02* (2006.01)
*H04R 1/02* (2006.01)
*H04R 1/08* (2006.01)

(52) U.S. Cl.
CPC .......... *F25D 23/028* (2013.01); *H04R 1/028* (2013.01); *H04R 1/08* (2013.01)

(58) Field of Classification Search
CPC ......... H04R 1/028; H04R 1/08; F25D 23/028; F25D 29/00; F25D 29/005; F25D 2700/04
See application file for complete search history.

(56) References Cited

U.S. PATENT DOCUMENTS 10,440,470 B2 10/2019 Park et al.
10,805,737 B2 10/2020 Zuo
(Continued)

FOREIGN PATENT DOCUMENTS

CN 204438659 U * 7/2015
CN 108302885 A * 7/2018 ............. F25D 23/02
(Continued)

OTHER PUBLICATIONS

Translation KR101931168B1, 8 pages (Year: 2018).*
(Continued)

*Primary Examiner* — Andrew Roersma
(74) *Attorney, Agent, or Firm* — Jefferson IP Law, LLP

(57) ABSTRACT

A refrigerator is provided. The refrigerator includes a main body in which a storage chamber having an open front surface is provided, a door rotatably coupled to the main body to open or close the storage chamber, and a microphone device disposed on an upper end of the door and configured to receive a voice command, wherein the microphone device includes a microphone supported by a substrate and configured to receive voice data, a cover protruding upward from the upper end of the door and including a voice input hole passing through a front surface and a rear surface of the cover and a microphone hole vertically extending downward from the voice input hole so that the voice input hole and the microphone are connected, and a sealing member disposed between the substrate and the cover so that the substrate is in close contact with the cover.

14 Claims, 18 Drawing Sheets

(56) References Cited

U.S. PATENT DOCUMENTS

| | | | |
|---|---|---|---|
| 11,076,212 B2 | 7/2021 | Kwon et al. | |
| 11,118,294 B2 | 9/2021 | An et al. | |
| 2013/0329932 A1 | 12/2013 | Sudo et al. | |
| 2018/0109871 A1* | 4/2018 | Huh | G06F 1/1652 |
| 2020/0072544 A1 | 3/2020 | Lee et al. | |
| 2020/0182539 A1* | 6/2020 | Hwang | F25D 23/02 |

FOREIGN PATENT DOCUMENTS

| | | | | | |
|---|---|---|---|---|---|
| CN | 207936601 | U | * | 10/2018 | |
| CN | 210119979 | U | | 2/2020 | |
| CN | 211372926 | U | | 8/2020 | |
| EP | 3 690 369 | A1 | | 8/2020 | |
| JP | H05-49089 | A | | 2/1993 | |
| JP | 2002-191089 | A | | 7/2002 | |
| JP | 3393258 | B2 | | 4/2003 | |
| JP | 2013-110632 | A | | 6/2013 | |
| JP | 2016-183786 | A | | 10/2016 | |
| JP | 2017-133801 | A | | 8/2017 | |
| JP | 2017-133818 | A | | 8/2017 | |
| JP | 2022-099668 | A | | 7/2022 | |
| KR | 10-2006-0083495 | A | | 7/2006 | |
| KR | 1020070033131 | A | * | 3/2007 | F25D 23/028 |
| KR | 10-1417018 | B1 | | 7/2014 | |
| KR | 10-2018-0092219 | A | | 8/2018 | |
| KR | 10-1931168 | B1 | | 12/2018 | |
| KR | 10-2019-0084853 | A | | 7/2019 | |
| KR | 10-2019-0084860 | A | | 7/2019 | |
| KR | 10-2020-0095140 | A | | 8/2020 | |

OTHER PUBLICATIONS

Translation KR20190084860A, 30 pages (Year: 2019).*
Translation JP3393258B2, 8 pages (Year: 2003).*
European Search Report dated Apr. 23, 2024, issued in European Application No. 21919870.2.
International Search Report dated Mar. 21, 2022, issued in International Application No. PCT/KR2021/017462.

* cited by examiner

REFRIGERATOR

CROSS-REFERENCE TO RELATED APPLICATION(S)

This application is a continuation application, claiming priority under § 365(c), of an International application No. PCT/KR2021/017462, filed on Nov. 25, 2021, which is based on and claims the benefit of a Korean patent application number 10-2021-0006840, filed on Jan. 18, 2021, in the Korean Intellectual Property Office, the disclosure of which is incorporated by reference herein in its entirety.

BACKGROUND

1. Field

The disclosure relates to a refrigerator provided with a microphone mounted on a door.

2. Description of Related Art

The refrigerator is an apparatus provided with a main body having a storage chamber and a cold air supply system configured to supply cold air to the storage chamber to keep food fresh. The storage chamber includes a cold storage chamber maintained at approximately 0 to 5° C. to refrigerate food and a freezer chamber maintained at approximately 0 to −30° C. to freeze and store food. A door may be rotatably provided on a front surface of the main body to open or close the storage chamber.

Recent refrigerators are gradually becoming larger and multi-multifunctional in trends of changes in diet and using high-end products, and refrigerators provided with various convenience devices for improving user convenience are being released.

In particular, in recent years, refrigerators which allow a user to control the operation of the refrigerators using a voice have been variously developed. In the case of a refrigerator, when both hands of a user hold an object, there may be problems that opening or closing of a door or the operation of the refrigerator is not freely performed. In order to address the problems, a refrigerator in which a microphone is disposed and which receives the user's voice to control the operation of the refrigerator is being developed.

Although it is most preferable that the microphone be disposed on a front surface of a main body or a door to increase a voice recognition rate, a microphone hole may be formed at a position corresponding to a position at which the microphone is disposed and exposed to the outside, and thus an exterior of the refrigerator may be degraded.

In addition, when the microphone is disposed on the front surface of the door, the voice of the user positioned in front of the door may be easily recognized when the door is closed, but when the door is open, a recognition rate of recognizing the voice of the user may be low because the user faces a rear surface of the door.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an improved refrigerator configured to recognize a voice of a user in front of and behind a door regardless of whether the door is open or closed.

Additional aspects will be set forth in part in the description which follows and, in part, will be apparent from the description, or may be learned by practice of the presented embodiments.

In accordance with an aspect of the disclosure, a refrigerator is provided. The refrigerator includes a main body in which a storage chamber having an open front surface is provided, a door rotatably coupled to the main body to open or close the storage chamber, and a microphone device disposed on an upper end of the door and configured to receive a voice command, wherein the microphone device includes a microphone supported by a substrate and configured to receive voice data, a cover protruding upward from the upper end of the door and including a voice input hole passing through a front surface and a rear surface of the cover and a microphone hole vertically extending downward from the voice input hole so that the voice input hole and the microphone are connected, and a sealing member disposed between the substrate and the cover so that the substrate is in close contact with the cover.

The voice input hole and the microphone hole may be provided as a pair of voice input holes and a pair of microphone holes to be close to both left and right ends of the cover.

The voice input hole may include a front opening formed in the front surface of the cover, a rear opening formed in the rear surface of the cover, and a connecting pipe passing through the cover to connect the front opening and the rear opening.

The microphone hole may vertically extend downward from a central portion of the connecting pipe and form a cross section having a T shape with the voice input hole.

The microphone may be provided as a pair of microphones to correspond to the pair of voice input holes and disposed parallel to the voice input hole to be vertically connected to the microphone hole.

The sealing member may be provided as a pair of sealing members to correspond to the pair of microphones, and the substrate may include a pair of microphone supports configured to support the pair of microphones and a pair of sealing member attachment parts to which the pair of sealing members are attached.

The pair of sealing members and the substrate may include first through holes and second through holes passing through the pair of sealing members and the substrate so that voice data input through the microphone holes is transmitted to the pair of microphones.

The pair of sealing members may be formed of a rubber material or poron tape.

The pair of sealing members may be in close contact with the substrate to prevent loss of the voice data input to the microphones through the second through holes.

The substrate may be fixed to the cover using a pair of screws so that the substrate is in close contact with the pair of sealing members.

Each of the substrate and the cover may include a pair of first fastening holes and a pair of second fastening holes to which the pair of screws are fastened.

The sealing member may include a waterproof member formed of a mesh or waterproof material so that water or foreign matter is prevented from entering the microphone through the second through hole.

The sealing member may include a double-sided tape configured to attach the sealing member to the sealing member attachment part.

The door may include a cap door to which the cover is coupled and a cap door cover coupled to an upper portion of the cap door and provided with a cover through hole through which an upper portion of the cover passes so that the voice input hole formed in the cover is exposed to an outside.

The microphone may be supported by a microphone support formed on a lower surface of the substrate, the sealing member may be attached to a sealing member attachment part formed on an upper surface of the substrate, the substrate may be coupled to the cover, the cover may be coupled to the cap door, and the cap door cover may be coupled to the upper portion of the cap door.

According to embodiments of the disclosure, a voice can be recognized at both positions in front of and behind a door regardless of whether the door is open or closed.

In addition, since a commonly used cap door cover can be used regardless of the presence or absence of a microphone device, investment costs can be minimized.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
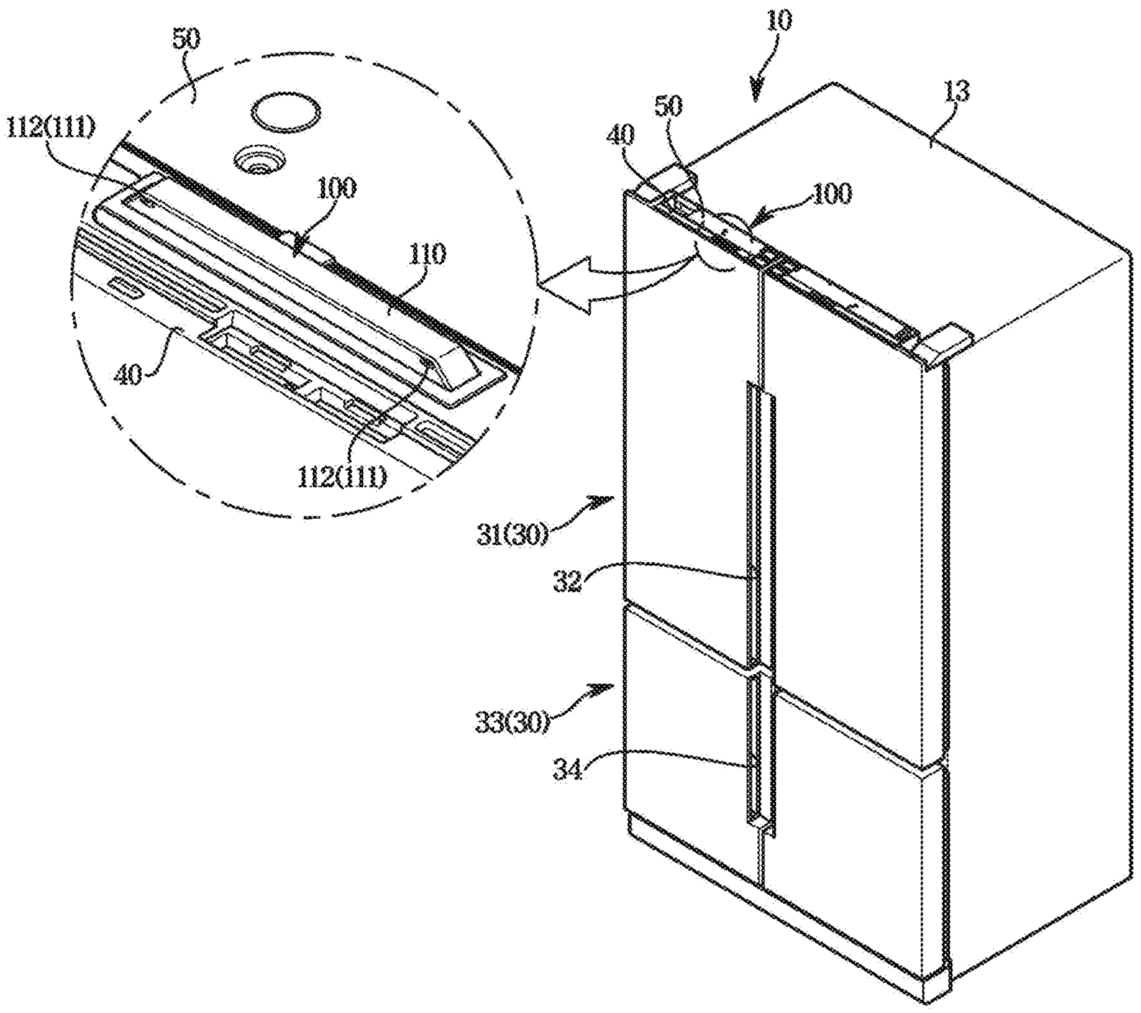
FIG. 1 is a front view illustrating a refrigerator in a state in which all doors are closed according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms “a,” “an,” and “the” include plural referents unless the context clearly dictates otherwise. Thus, for example, reference to “a component surface” includes reference to one or more of such surfaces.

In addition, the same reference numerals or symbols refer to parts or components which substantially perform the same function.

In addition, terms used in the specification are merely used to describe various embodiments, and are not intended to limit and/or restrict the embodiments. In the specification, terms such as “including,” “having,” or “comprising” are intended to indicate the presence of the features, numbers, steps, actions, components, parts, or combinations thereof described in the specification, and are not intended to preclude the possibility which one or more other features, numbers, steps, actions, components, parts, or combinations thereof may be present or added.

In addition, it should be understood that, although the terms "first," "second," and the like may be used in the specification to describe various components, these components should not be limited by these terms. These terms are only used to distinguish one component from another component. For example, a first component could be called a second component, and, similarly, a second component could be called a first component without departing from the scope of the disclosure. As used herein, the term "and/or" includes any one or combinations of the associated listed items.

Meanwhile, terms used in the specification such as "front end," "rear end," "upper portion," "lower portion," "upper end" and "lower end" are defined based on the drawings, and shapes and positions of components are not limited by the terms.

Hereinafter, embodiments according to the disclosure will be described in detail with reference to the accompanying drawings.

Although an example of a microphone device applied to a refrigerator will be described below according to the disclosure, the disclosure is not limited thereto. For example, the microphone device may be applied to other household appliances such as air conditioners, washing machines, ovens, etc.

FIG. 1 is a front view illustrating a refrigerator in a state in which all doors are closed according to an embodiment of the disclosure.

Figure 2:
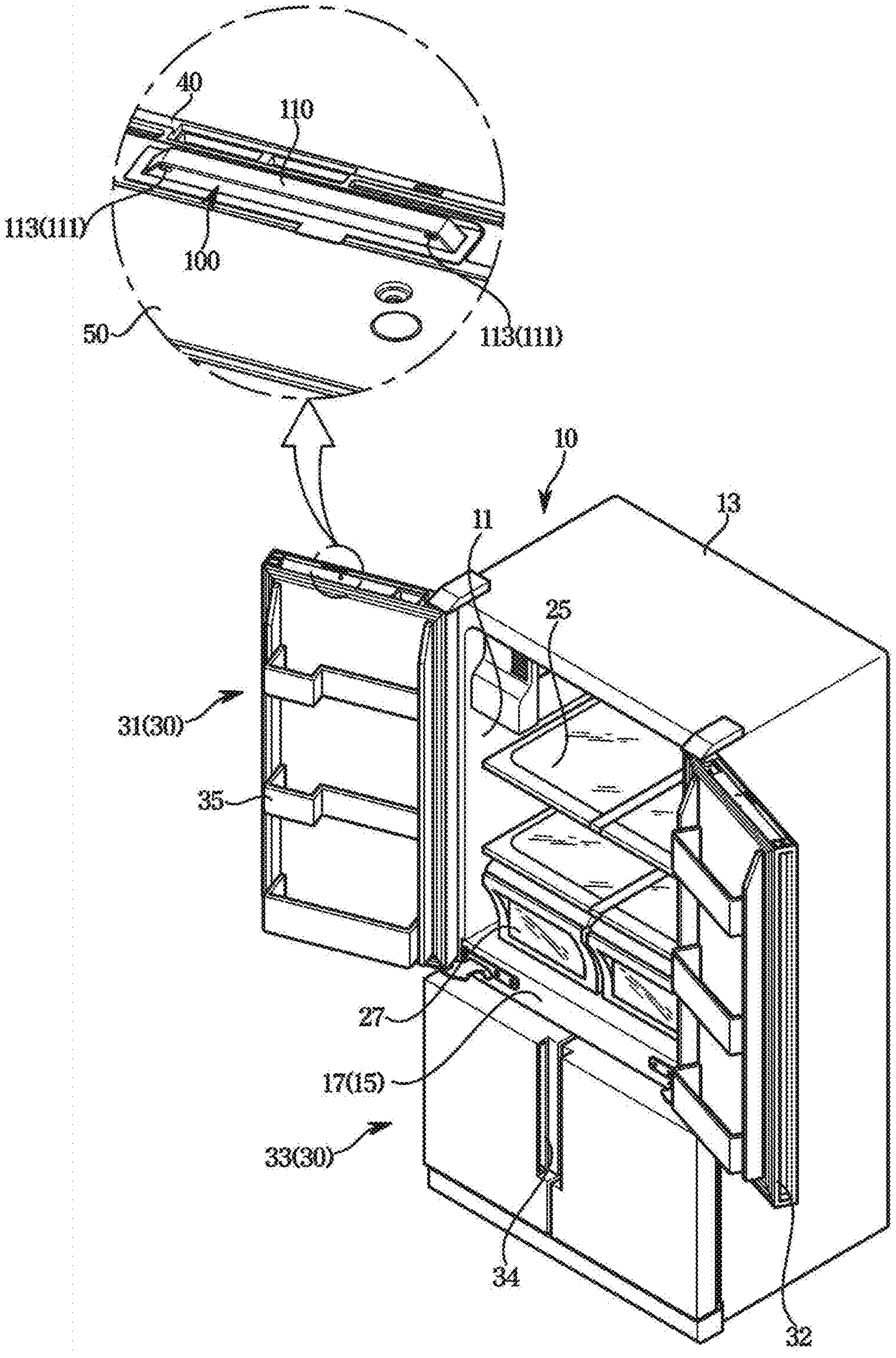
FIG. 2 is a view illustrating a state in which cold storage chamber doors of a refrigerator of FIG. 1 are open according to an embodiment of the disclosure.

FIG. 2 is a view illustrating a state in which cold storage chamber doors of the refrigerator of FIG. 1 are open according to an embodiment of the disclosure.

Referring to FIGS. 1 and 2, the refrigerator may include a main body 10, storage chambers 20 vertically divided in the main body 10, doors 30 which open or close the storage chambers 20, and a cold air supply apparatus (not shown) configured to supply cold air to the storage chambers 20.

The main body 10 includes inner cases 11 forming the storage chambers 20, an outer case 13 coupled to outer sides of the inner cases 11 to form an exterior, and an insulating material (not shown) foamed between the inner cases 11 and the outer case 13 to insulate the storage chambers 20.

A machine room (not shown) in which a compressor (not shown) configured to compress a refrigerant and a condenser (not shown) configured to condense the refrigerant compressed by the compressor are installed may be provided at a rear lower side of the main body 10.

The cold air supply apparatus may include the compressor configured to compress the refrigerant, the condenser configured to condense the refrigerant, an expansion valve (not shown) configured to expand the refrigerant, and an evaporator (not shown) configured to evaporate the refrigerant.

The storage chambers 20 may be divided into a plurality of storage chambers 20 using partitions 15, and a plurality of shelves 25 and storage containers 26 may be provided in the storage chambers 20 to store food and the like.

The storage chambers 20 may be divided into a plurality of storage chambers 21 and 23 using the partitions 15, and the partitions 15 may include a first partition, which is transversely coupled to the storage chambers 20 to divide the storage chambers 20 into a cold storage chamber 21 which is an upper storage chamber and a freezer chamber 23 which is a lower storage chamber, and a second partition (not shown) which is vertically coupled to the freezer chamber 23 to divide the freezer chamber 23 into a first storage chamber (not shown) at a left side and a second storage chamber (not shown) at a right side.

Although the entire lower storage chamber 23 may be used as a freezer chamber, the first storage chamber may be used as a freezer chamber, and the second storage chamber may be used as a cold storage chamber. Alternatively, the first storage chamber may be used as a freezer chamber, and the second storage chamber may be used as both a freezer chamber and a cold storage chamber.

Although an example of the division of the storage chambers 20 has been described, each the storage chambers 21 and 23 may be used differently from the above example.

The cold storage chamber 21 and the freezer chamber 23 may be opened or closed by the doors 30 rotatably coupled to the main body 10. The doors 30 may include a pair of cold storage chamber doors 31 rotatably coupled to the main body 10 to open or close the cold storage chamber 21 and a pair of freezer chamber doors 33 rotatably coupled to the main body 10 to open or close the freezer chamber 23.

The pair of cold storage chamber doors 31 may be opened or closed using cold storage chamber door handles 32. The pair of freezer chamber doors 33 may be opened or closed by freezer chamber door handles 34. Sliding doors may be applied as the doors for opening or closing the freezer chamber 23. Door guards 35 for storing food may be provided on rear surfaces of the pair of cold storage chamber doors 31 and the pair of freezer chamber doors 33.

A microphone device 100 configured to allow a user to control an operation of the refrigerator using a voice may be provided on an upper end of one of the pair of cold storage chamber doors 31. This will be described in detail below.

Figure 3:
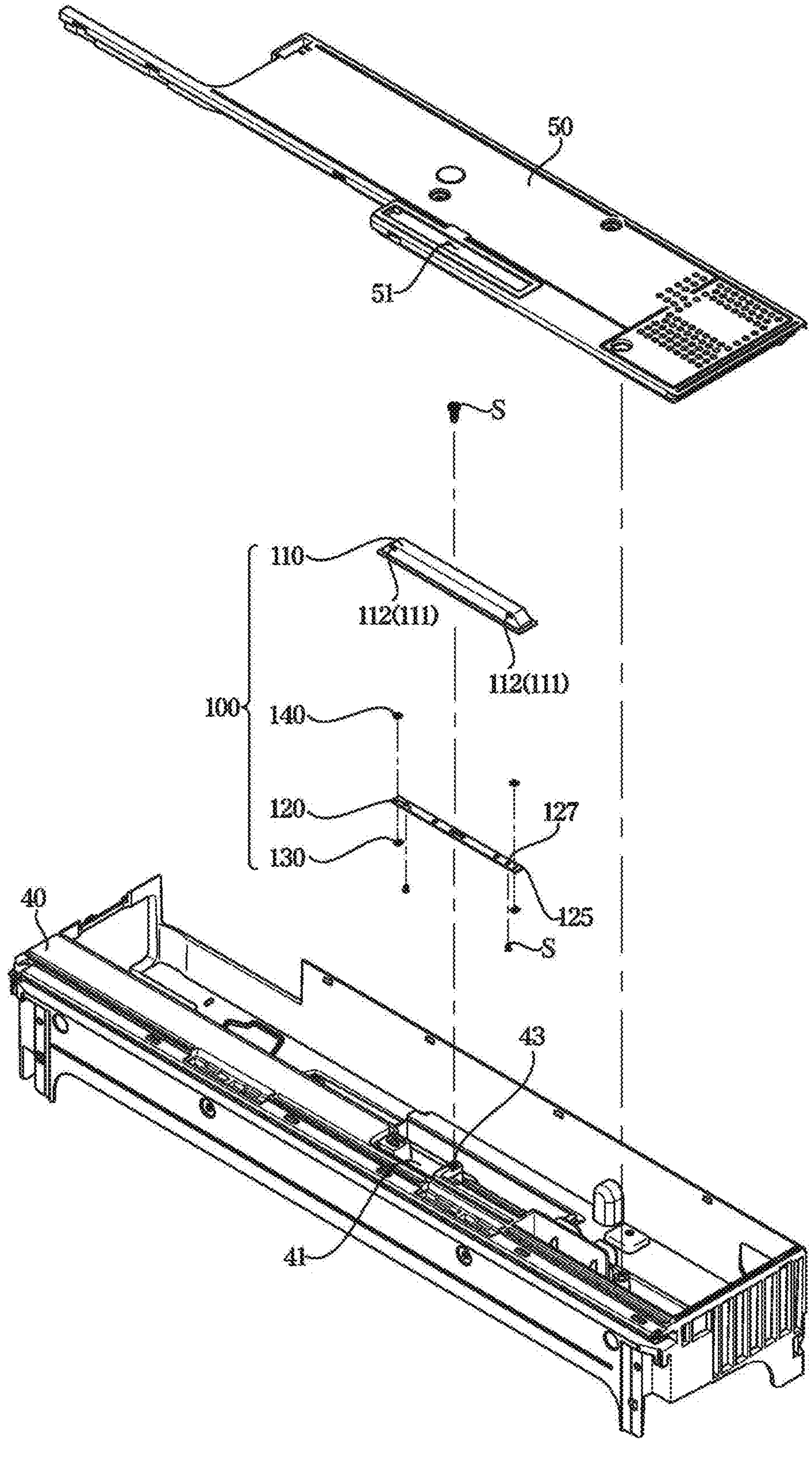
FIG. 3 is a view illustrating an operation of coupling a microphone device and a cap door cover to a cap door according to an embodiment of the disclosure.

FIG. 3 is a view illustrating an operation of coupling the microphone device and a cap door cover to a cap door according to an embodiment of the disclosure.

Figure 4:
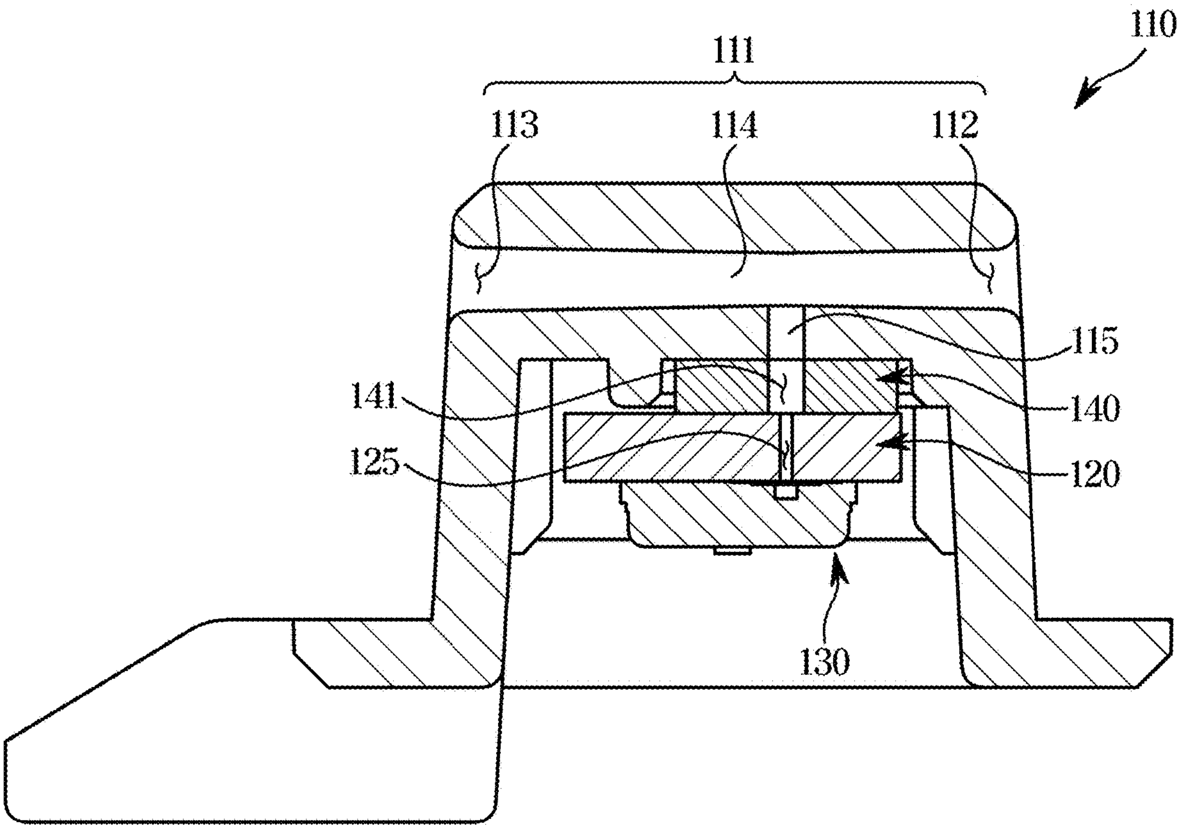
FIG. 4 is a schematic cross-sectional view illustrating a microphone device according to an embodiment of the disclosure.

FIG. 4 is a schematic cross-sectional view illustrating the microphone device according to an embodiment of the disclosure.

Figure 5:
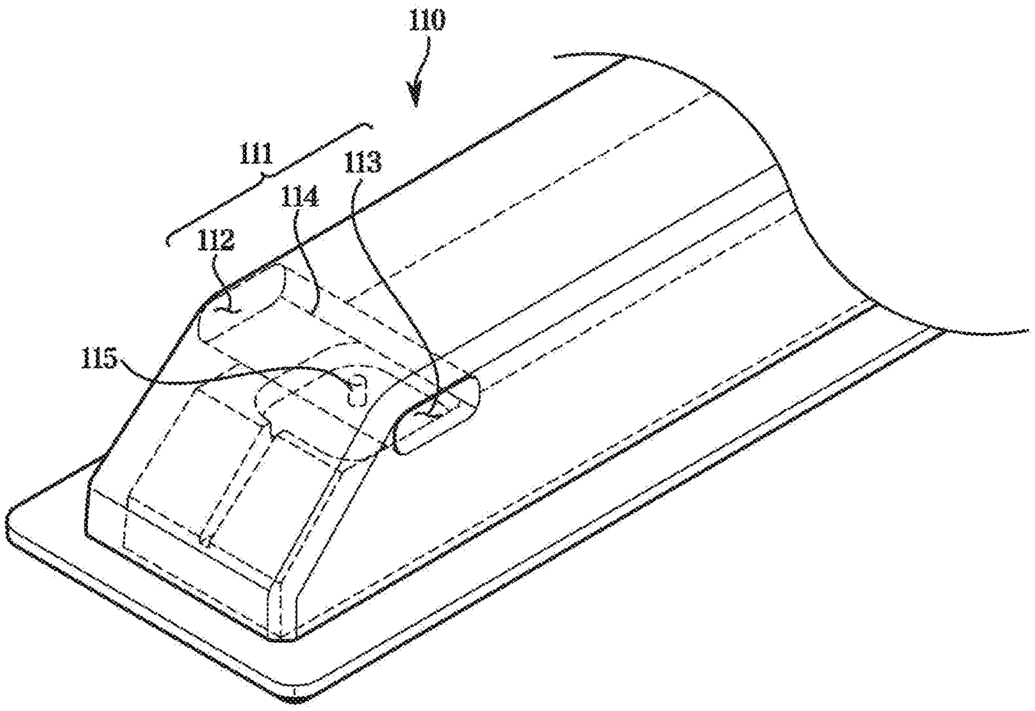
FIG. 5 is a view illustrating a state in which a voice input hole and a microphone hole are formed in a cover according to an embodiment of the disclosure.

FIG. 5 is a view illustrating a state in which a voice input hole and a microphone hole are formed in a cover according to an embodiment of the disclosure.

Referring to FIGS. 3 to 5, the microphone device 100 may be coupled to a cap door 40 on the cold storage chamber door 31. The microphone device 100 may be seated on a microphone device seating portion 41 of the cap door 40. The microphone device 100 may allow the user to control an operation of the refrigerator using a voice. The microphone device 100 may include a cover 110 coupled to the cap door 40. The microphone device 100 may include a substrate 120 fastened to the cover 110. The microphone device 100 may include a microphone 130 which is supported by the substrate 120 and receives voice data. The microphone device 100 may include a sealing member 140 disposed between the substrate 120 and the cover 110.

The microphone device 100 may allow the user to control the operation of the refrigerator by allowing the user's voice data to be input to the microphone 130 through a voice input hole 111 and a microphone hole 115 formed in the cover 110.

The cover 110 may protrude upward from the upper end of the cold storage chamber door 31. The cover 110 may be coupled to the cap door 40 of the upper end of the cold storage chamber door 31. An upper portion of the cap door 40 may be covered by a cap door cover 50. The cover 110 may protrude upward from the cap door cover 50 through a cover through hole 51 of the cap door cover 50.

The cover 110 may include the voice input hole 111 through which the user's voice is input. The voice input hole 111 may be provided as a pair of voice input holes 111 adjacent to left and right ends of the cover 110. An upper portion of the cover 110 in which the voice input holes 111 are formed may pass through the cover through hole 51 to protrude upward from the cap door cover 50 so that the voice input holes 111 are exposed to the outside.

The voice input hole 111 may include a front opening 112 formed in a front surface of the cover 110. The voice input hole 111 may include a rear opening 113 formed in a rear surface of the cover 110. The voice input hole 111 may include a connecting pipe 114 which passes through the cover 110 and connect the front opening 112 and the rear opening 113. When the cold storage chamber door 31 is closed, the user's voice may be input through the front opening 112. When the cold storage chamber door 31 is open, the user's voice may be input through the rear opening 113. Since the voice input hole 111 is formed at both a front side and a rear side of the cold storage chamber door 31, the user's voice data may be effectively input to the voice input hole 111 and transmitted to the microphone 130 regardless of opening or closing of the cold storage chamber door 31 (see FIGS. 1 and 2).

The cover 110 may include the microphone hole 115 which transmits the voice data input through the voice input hole 111 to the microphone 130. The microphone hole 115 may vertically extend downward from a central portion of the voice input hole 111. The microphone hole 115 may vertically extend downward from a central portion of the connecting pipe 114 of the voice input hole 111. The microphone hole 115 may form a cross section having a T shape with the voice input hole 111. The microphone hole 115 may be provided as a pair of microphone holes 115 adjacent to the left and right ends of the cover 110. The voice data input through the front opening 112 and the rear opening 113 may be accurately input to the microphone 130 through the microphone hole 115.

The cover 110 may include a coupling hole 116 coupled to the cap door 40 using a screw S. The cap door 40 may include a microphone device coupling hole 43 to which the cover 110 is coupled using the screw S. When the cover 110 is seated on the microphone device seating portion 41 of the cap door 40, the coupling hole 116 and the microphone device coupling hole 43 may be coupled using the screw S, and thus the cover 110 may be coupled to the cap door 40 (see FIG. 13).

The cover 110 may include a second fastening hole 117 to which the substrate 120 is fastened using a screw S. The substrate 120 may include a first fastening hole 127 fastened to the second fastening hole 117 of the cover 110 using the screw S (see FIG. 11).

The substrate 120 may include a microphone support 121 which supports the microphone 130. The substrate 120 may include a sealing member attachment part 123 to which the sealing member 140 is attached. The substrate 120 may include a second through hole 125 which passes through the substrate 120 to transmit voice data input through the voice input hole 111 and the microphone hole 115 to the microphone 130. The second through hole 125 may be connected to a first through hole 141 of the sealing member 140. The first through hole 141 may be connected to the microphone hole 115. Accordingly, the voice data input to the voice input hole 111 may be input to the microphone 130 through the microphone hole 115, the first through hole 141, and the second through hole 125. The substrate 120 may include the first fastening hole 127 fastened to the cover 110 using the screw S (see FIGS. 6 and 7).

The microphone 130 may be supported by the microphone support 121 of the substrate 120. The microphone 130 may be provided as a pair of microphones 130 to correspond to the pair of voice input holes 111. The microphone 130 may be disposed parallel to the voice input hole 111 to be vertically connected to the microphone hole 115. The microphone 130 may receive the voice data through the voice input hole 111, the microphone hole 115, the first through hole 141, and the second through hole 125 (See FIG. 7).

The sealing member 140 may be disposed between the substrate 120 and the cover 110. Due to the sealing member 140, the substrate 120 may be in close contact with the cover 110. The sealing member 140 may be formed of a rubber material or poron tape so that the substrate 120 is in close contact with the cover 110. Due the sealing member 140, the substrate 120 can be in close contact with the cover 110 to prevent loss of voice data input to the voice input hole 111 so that the voice data is input to the microphone 130.

The sealing member 140 may include the first through hole 141 connected to the microphone hole 115. The first through hole 141 may be connected to the second through hole 125 of the substrate 120. The sealing member 140 may be in close contact with the substrate 120 to prevent loss of voice data input to the microphone 130 through the second through hole 125. The sealing member 140 may further be in close contact with the substrate 120 using the screw S which fastens the substrate 120 to the cover 110.

The sealing member 140 may include a double-sided tape 143. The double-sided tape 143 may be attached to one surface of the sealing member 140 so that the sealing member 140 may be attached to the sealing member attachment part 123 of the substrate 120 (see FIG. 6).

The sealing member 140 may include a waterproof member 145 formed of a mesh or waterproof material. The waterproof member 145 may be provided on a surface of the sealing member 140 opposite to a surface to which the double-sided tape 143 is attached. The sealing member 140 may be in close contact with the substrate 120 to prevent water or foreign matter from entering the microphone 130 through the second through hole 125, and the entrance of the water or foreign matter can be more effectively prevented by the waterproof member 145 (see FIG. 6).

Then, a process of assembling the microphone device 100 by coupling the substrate 120 to the cover 110 after the microphone 130 is supported by the substrate 120, and the sealing member 140 is attached to the substrate 120 will be described with reference to FIGS. 6 to 12.

Figure 6:
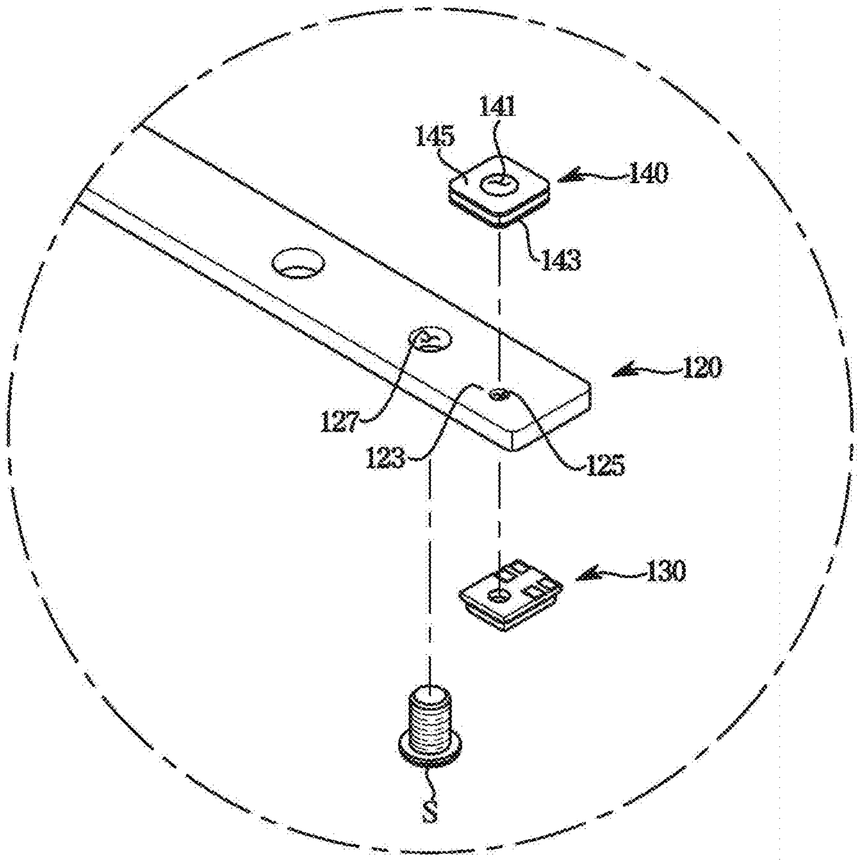
FIG. 6 is an exploded view illustrating a state in which a microphone and a sealing member are separated from a substrate according to an embodiment of the disclosure.

FIG. 6 is an exploded view illustrating a state in which the microphone and the sealing member are separated from the substrate according to an embodiment of the disclosure.

Figure 7:
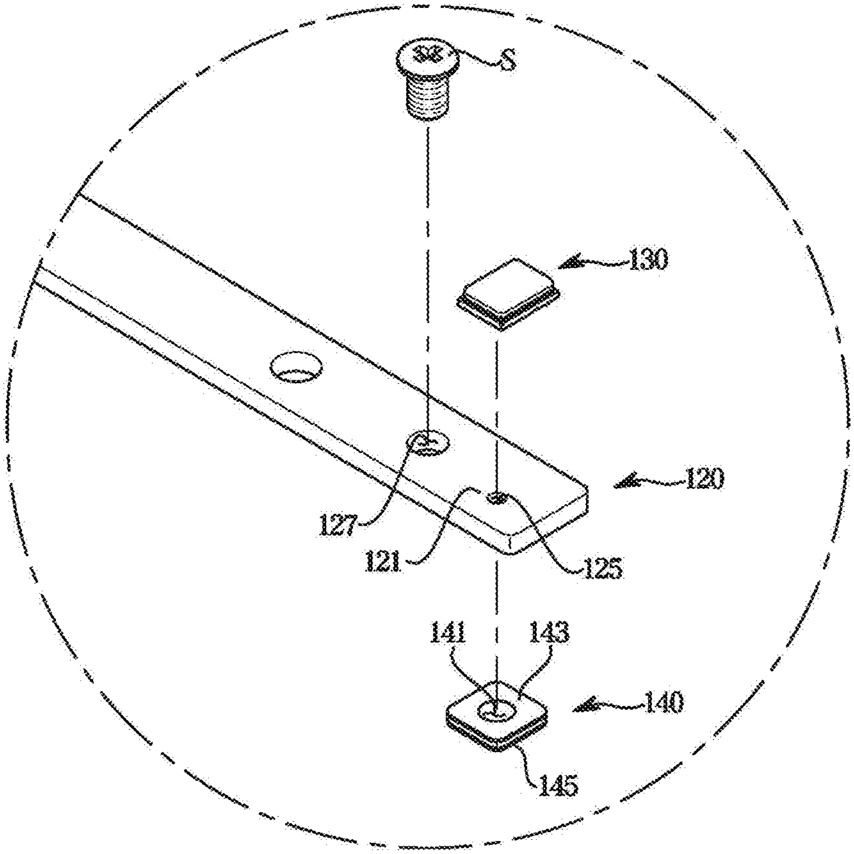
FIG. 7 is a view illustrating a state of FIG. 6 in a direction opposite to a viewing direction of FIG. 6 according to an embodiment of the disclosure.

FIG. 7 is a view illustrating the state of FIG. 6 in a direction opposite to a viewing direction of FIG. 6 according to an embodiment of the disclosure.

Figure 8:
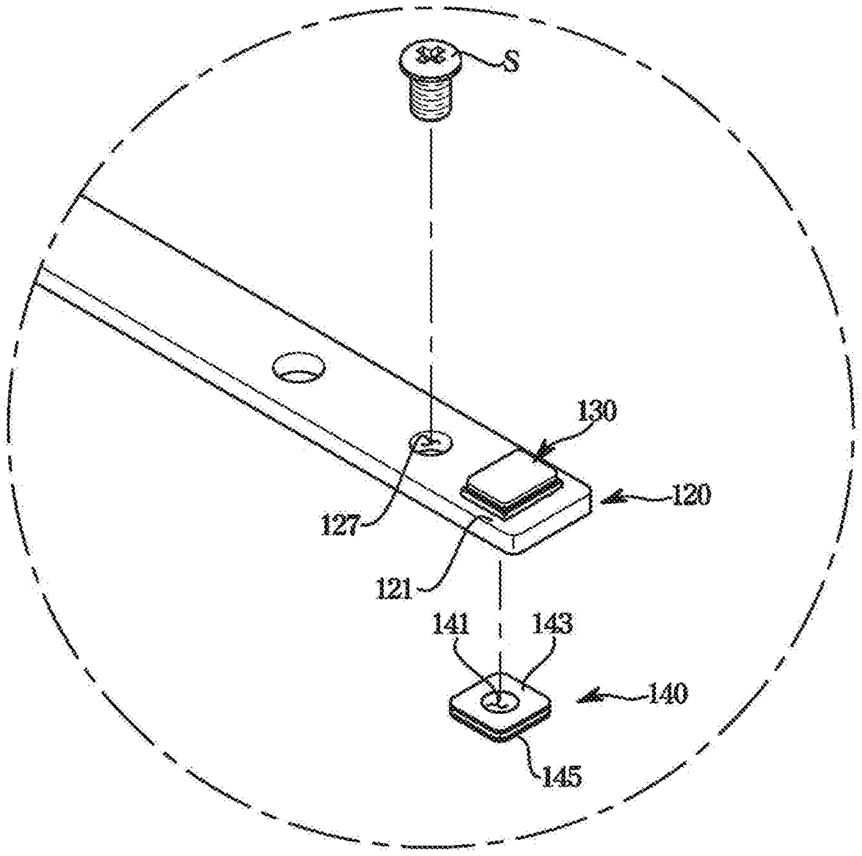
FIG. 8 is a view illustrating a state in which a microphone is supported by a substrate according to an embodiment of the disclosure.

FIG. 8 is a view illustrating a state in which the microphone is supported by the substrate according to an embodiment of the disclosure.

Figure 9:
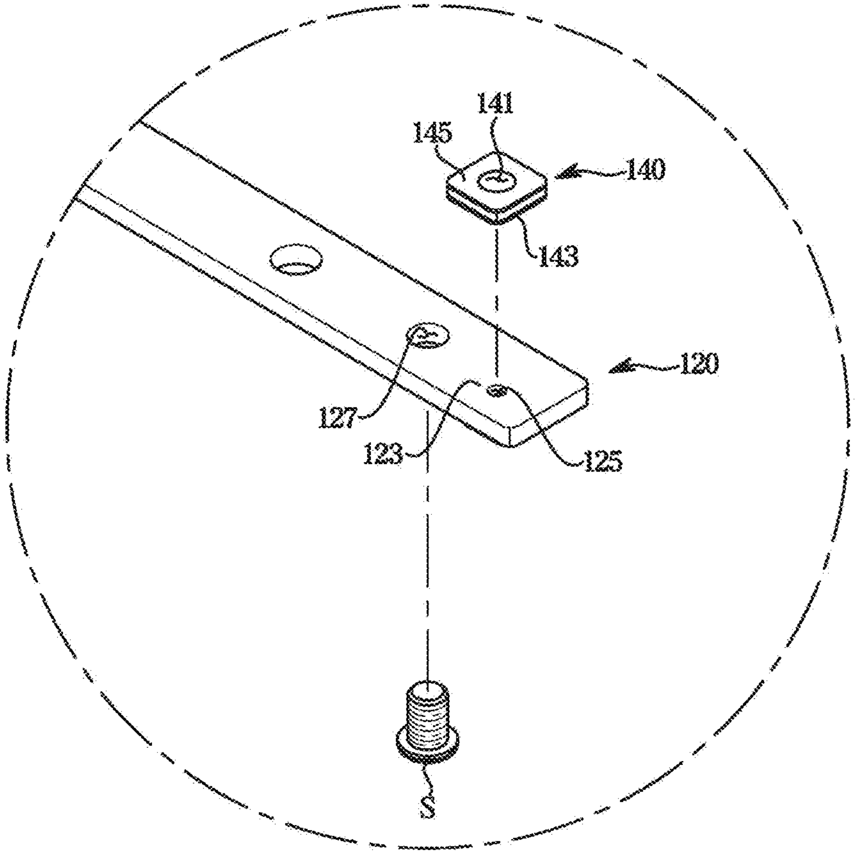
FIG. 9 is a view illustrating an operation of attaching a sealing member to a substrate according to an embodiment of the disclosure.

FIG. 9 is a view illustrating an operation of attaching the sealing member to the substrate according to an embodiment of the disclosure.

Figure 10:
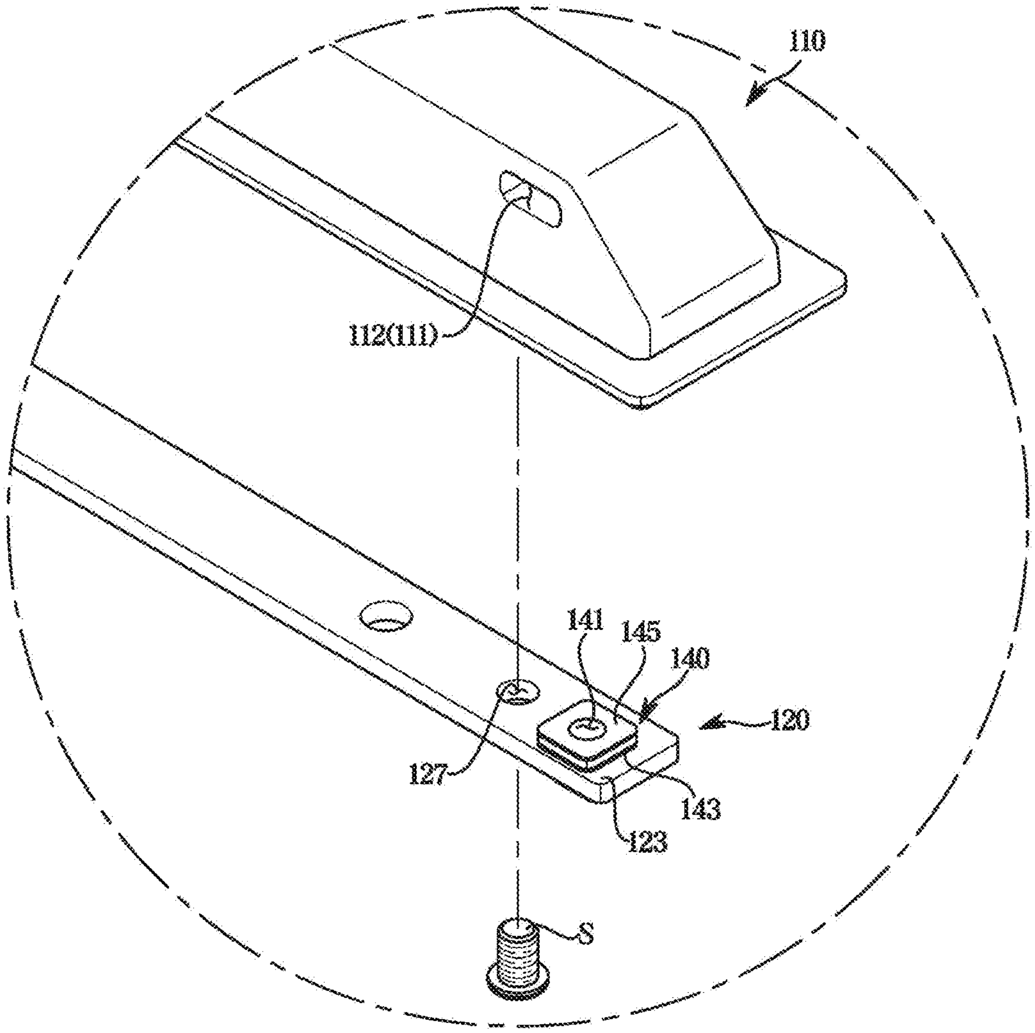
FIG. 10 is a view illustrating a state in which a sealing member is attached to a substrate according to an embodiment of the disclosure.

FIG. 10 is a view illustrating a state in which the sealing member is attached to the substrate according to an embodiment of the disclosure.

Figure 11:
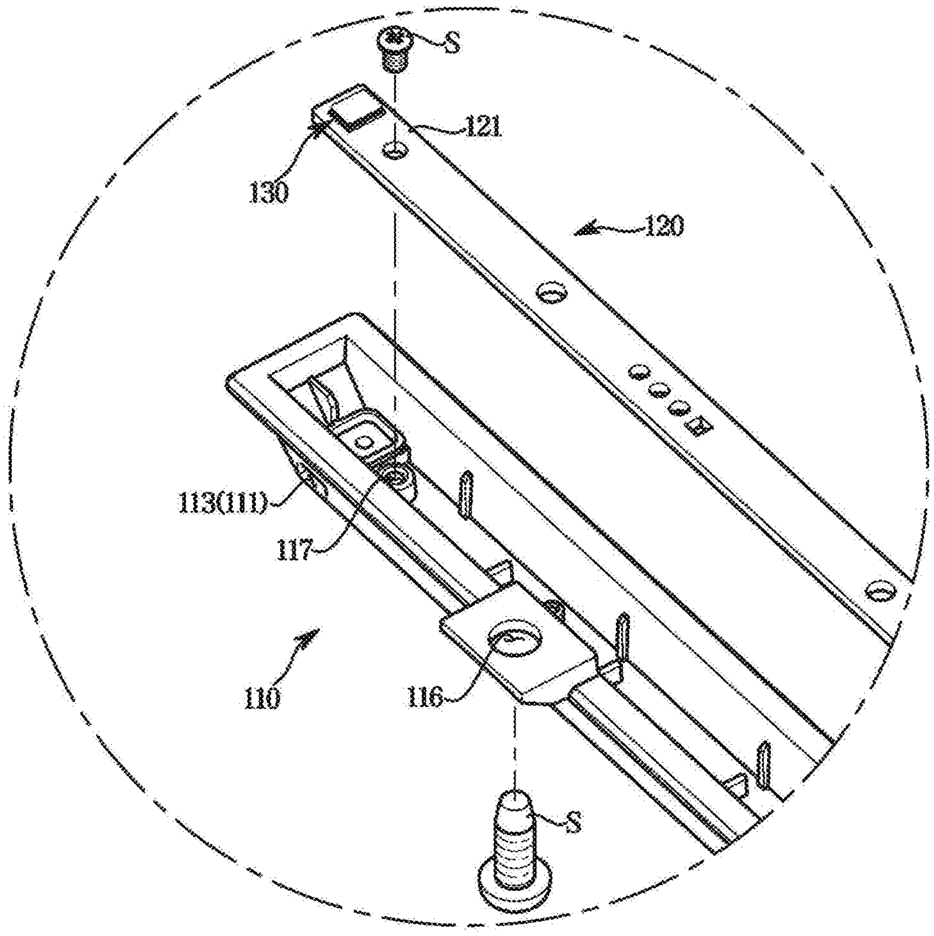
FIG. 11 is a view illustrating an operation of coupling a substrate to a cover using a screw according to an embodiment of the disclosure.

FIG. 11 is a view illustrating an operation of coupling the substrate to the cover using the screw according to an embodiment of the disclosure.

Figure 12:
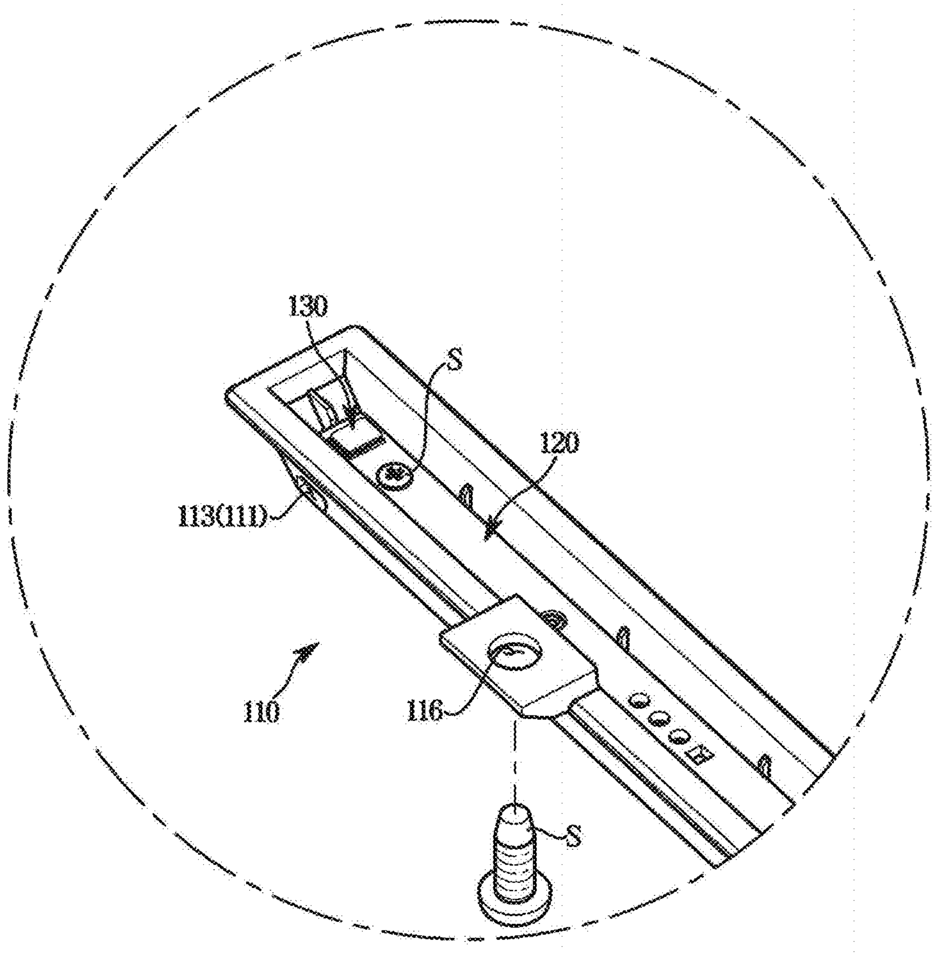
FIG. 12 is a view illustrating a state in which a substrate is coupled to a cover according to an embodiment of the disclosure.

FIG. 12 is a view illustrating a state in which the substrate is coupled to the cover according to an embodiment of the disclosure.

Referring to FIGS. 6 and 7, the microphone support 121 which supports the microphone 130 may be provided on one surface of the substrate 120. The sealing member attachment part 123 to which the sealing member 140 is attached may be provided on the other surface of the substrate 120.

Referring to FIG. 8, the microphone 130 may be supported by the microphone support 121 of the substrate 120. When the microphone 130 is supported by the substrate 120, the sealing member 140 may be attached to the sealing member attachment part 123 of the substrate 120 as illustrated in FIG. 9.

When the sealing member 140 is attached to the substrate 120, the first fastening hole 127 of the substrate 120 may be fastened to the second fastening hole 117 of the cover 110 using the screw S as illustrated in FIGS. 10 to 12. When the substrate 120 which supports the microphone 130 and to which the sealing member 140 is attached is fastened to the cover 110, assembly of the microphone device 100 can be completed.

Figure 13:
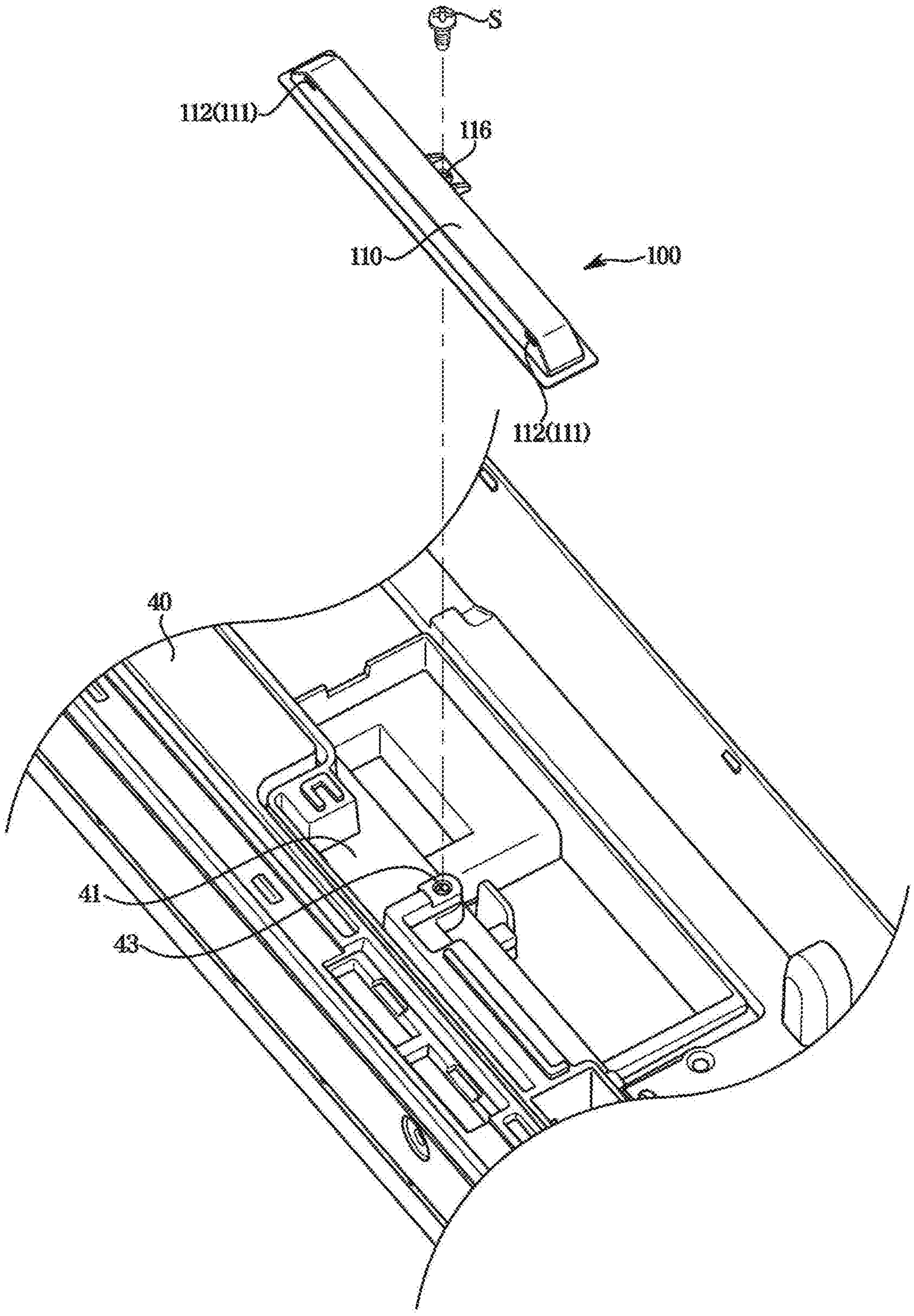
FIG. 13 is a view illustrating an operation of coupling a microphone device to an upper portion of a cap door using a screw according to an embodiment of the disclosure.

FIG. 13 is a view illustrating an operation of coupling the microphone device to the upper portion of the cap door using the screw according to an embodiment of the disclosure.

Figure 14:
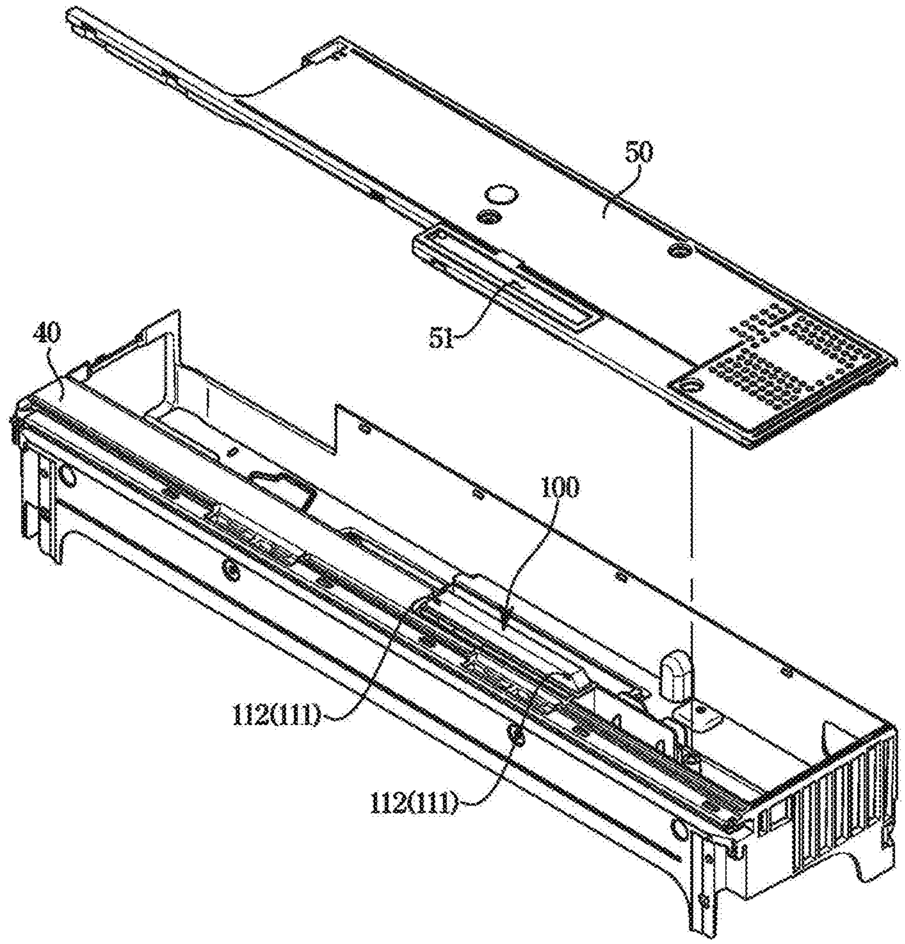
FIG. 14 is a view illustrating an operation of coupling a cap door cover to a cap door according to an embodiment of the disclosure.

FIG. 14 is a view illustrating an operation of coupling the cap door cover to the cap door according to an embodiment of the disclosure.

Figure 15:
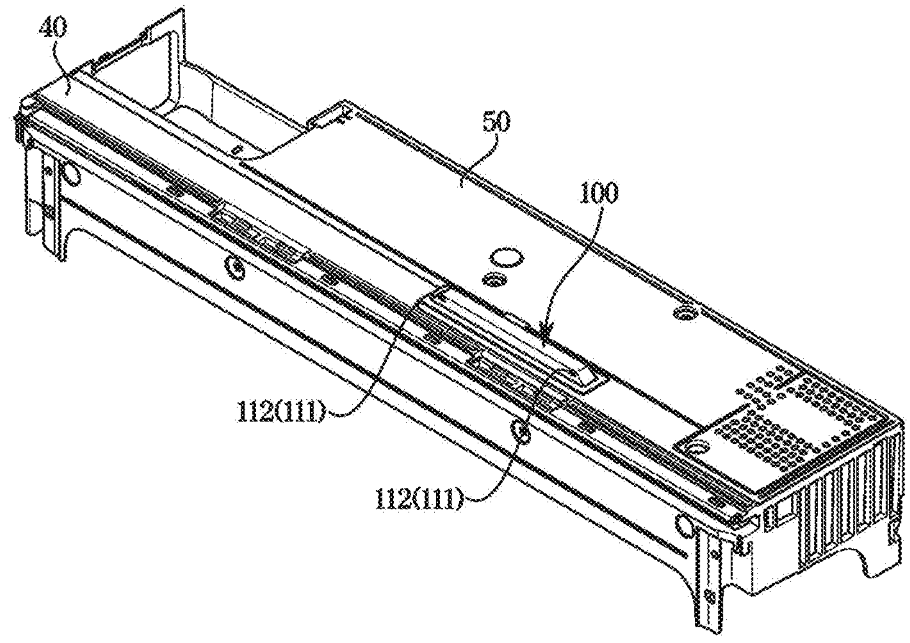
FIG. 15 is a view illustrating a state in which a cap door cover is coupled to a cap door according to an embodiment of the disclosure.

FIG. 15 is a view illustrating a state in which the cap door cover is coupled to the cap door according to an embodiment of the disclosure.

Referring to FIG. 13, when the microphone device 100 is assembled, the microphone device 100 may be coupled to the upper portion of the cap door 40. The microphone device seating portion 41 on which the microphone device 100 is seated may be provided on the cap door 40. After the microphone device 100 is seated on the microphone device seating portion 41, the microphone device 100 may be coupled to the cap door 40 using the screw S. The screw S may be coupled to the coupling hole 116 formed in the cover 110 and the microphone device coupling hole 43 of the cap door 40 to couple the microphone device 100 to the cap door 40.

Referring to FIGS. 14 and 15, when the microphone device 100 is coupled to the cap door 40, the cap door cover 50 may be coupled to the upper portion of the cap door 40. When the cap door cover 50 is coupled to the upper portion of the cap door 40, an upper portion of the cover 110 of the microphone device 100 may protrude outward through the cover through hole 51 formed in the cap door cover 50. That is, the voice input hole 111 formed in the cover 110 may be exposed upward from the cap door cover 50 to be exposed to the outside.

Figure 16:
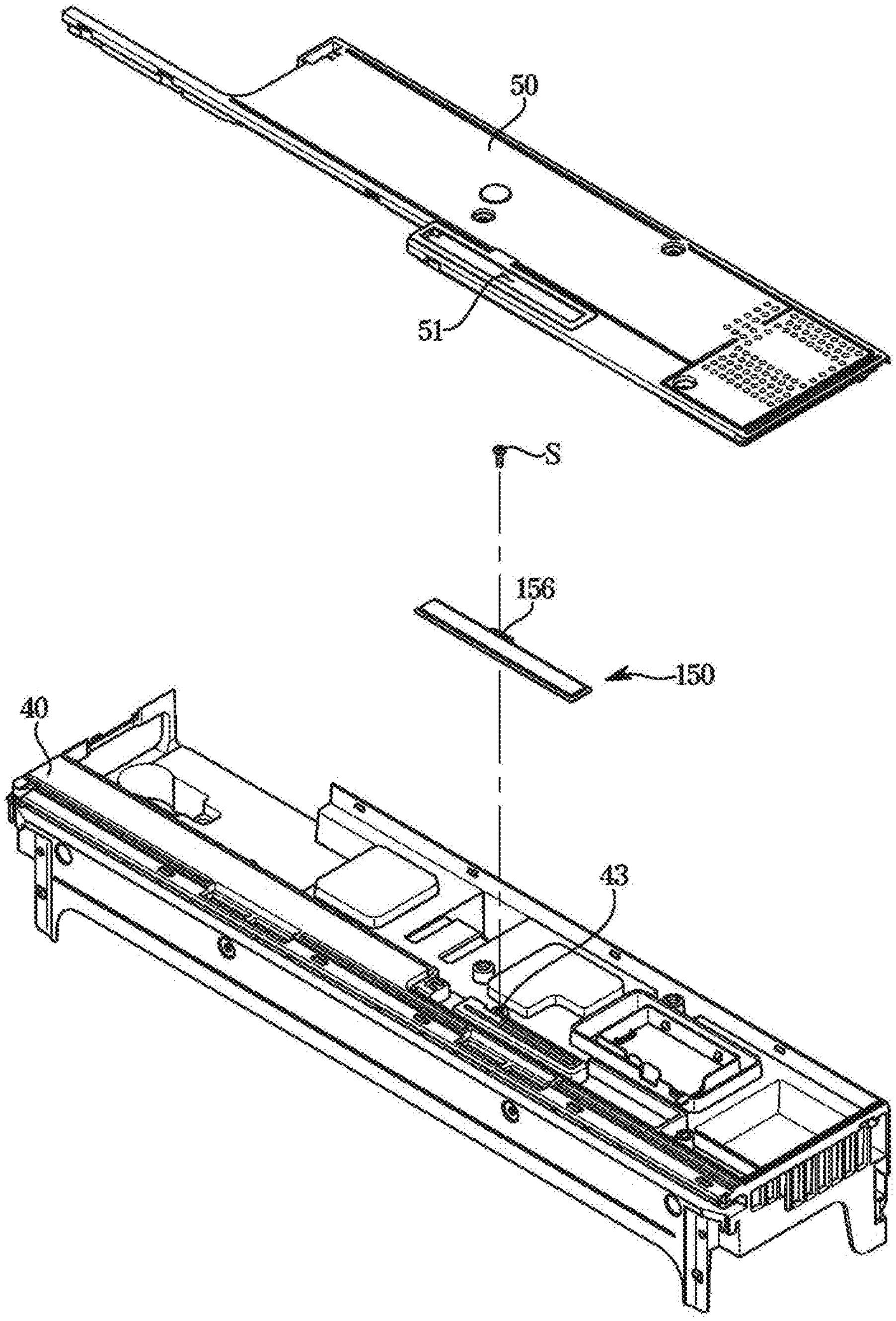
FIG. 16 is a view illustrating an operation of coupling a cover and a cap door cover to a cap door according to an embodiment of the disclosure.

FIG. 16 is a view illustrating an operation of coupling a cover and a cap door cover to a cap door according to an embodiment of the disclosure.

Figure 17:
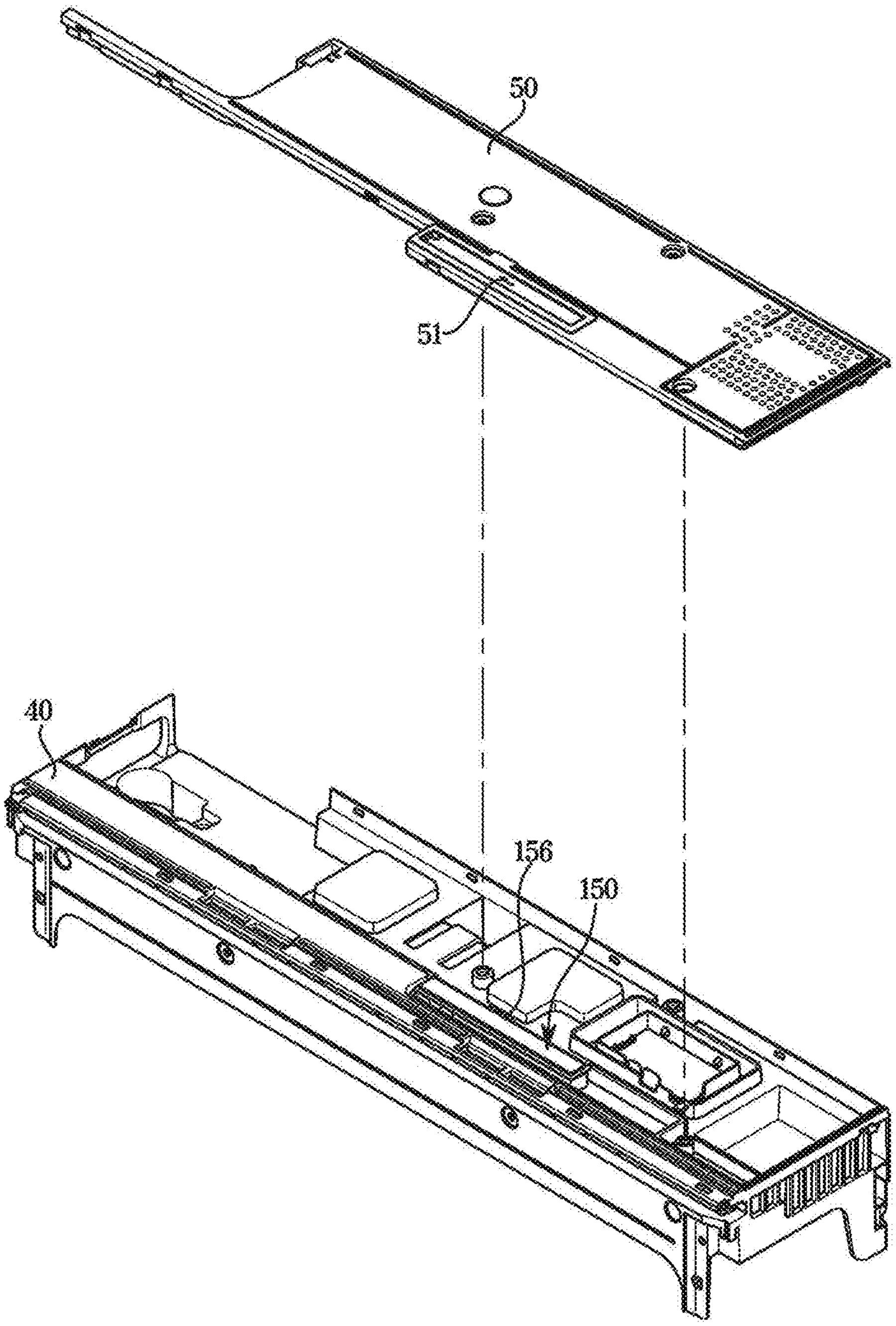
FIG. 17 is a view illustrating an operation of coupling a cap door cover to a cap door according to an embodiment of the disclosure.

FIG. 17 is a view illustrating an operation of coupling the cap door cover to the cap door according to an embodiment of the disclosure.

Figure 18:
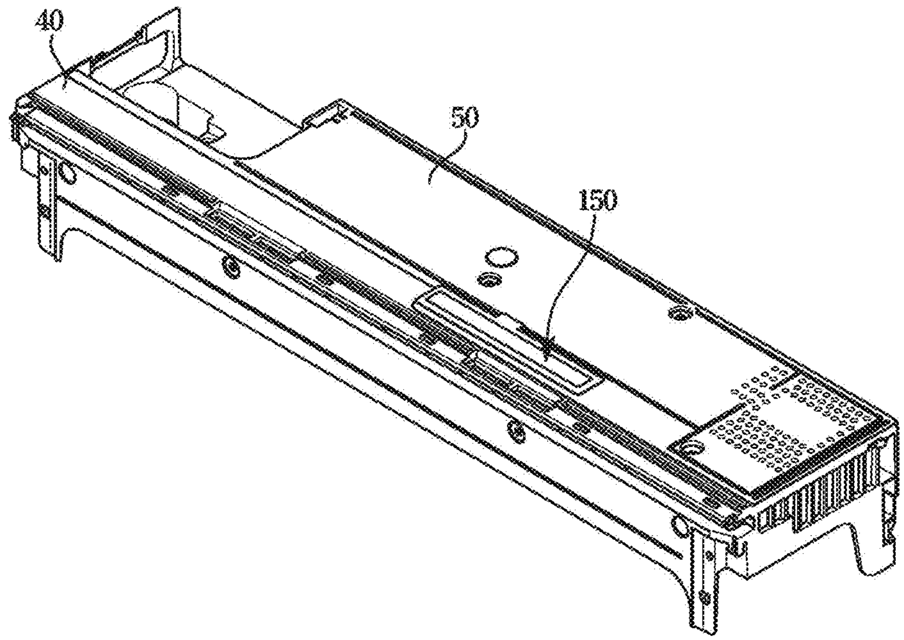
FIG. 18 is a view illustrating a state in which a cap door cover is coupled to a cap door according to an embodiment of the disclosure.

FIG. 18 is a view illustrating a state in which the cap door cover is coupled to the cap door according to an embodiment of the disclosure.

Referring to FIG. 16, in the case of a refrigerator without a microphone device, a cover 150 may be coupled to an upper portion of a cap door 40. The cover 150 may be coupled to the upper portion of the cap door 40 using the screw S. To this end, a coupling hole 156 may be formed in the cover 150. The screw S may be coupled to the coupling hole 156 formed in the cover 150 and a microphone device coupling hole 43 of the cap door 40 so that the cover 150 is coupled to the cap door 40. This may be to manufacture the same cap door cover 50 covering the upper portion of the cap door 40 regardless of the presence or absence of a microphone device. That is, when the cap door cover 50 in which a cover through hole 51 is formed is manufactured regardless of the presence or absence of a microphone device, the cover 150 may be coupled to the upper portion of the cap door 40 because the cover through hole 51 should be covered.

When the cover 150 is coupled to the upper portion of the cap door 40, the cap door cover 50 may be coupled to the upper portion of the cap door 40 as illustrated in FIGS. 17 and 18. When the cap door cover 50 is coupled to the upper portion of the cap door 40, the cover through hole 51 formed in the cap door cover 50 may be covered by the cover 150. In this case, since components constituting a microphone device are not coupled to the cover 150, the cover through hole 51 may have a height which may only cover the cover through hole 51 without being exposed upward from the cover through hole 51. As described above, the commonly used cap door cover 50 may be used regardless of the presence or absence of a microphone device, and thus investment costs can be minimized.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A refrigerator comprising:
- a main body in which a storage chamber having an open front surface is provided;
- a door rotatably coupled to the main body to open or close the storage chamber; and
- a microphone device disposed on an upper end of the door and configured to receive a voice command,
- wherein the microphone device includes:
  - a microphone supported by a substrate and configured to receive voice data,
  - a cover protruding upward from the upper end of the door and including a voice input hole passing through a front surface and a rear surface of the cover and a microphone hole vertically extending downward from the voice input hole so that the voice input hole and the microphone are connected, and
  - a sealing member disposed between the substrate and the cover so that the substrate is in close contact with the cover, the sealing member being disposed on an opposite side of the substrate from the microphone, and
- wherein the door includes:
  - a cap door to which the cover is coupled; and
  - a cap door cover coupled to an upper portion of the cap door and provided with a cover through hole through which an upper portion of the cover passes so that the voice input hole formed in the cover is exposed to an outside.

2. The refrigerator of claim 1, wherein the voice input hole and the microphone hole are provided as a pair of voice input holes and a pair of microphone holes to be close to both left and right ends of the cover.

3. The refrigerator of claim 1, wherein the voice input hole includes:
- a front opening formed in the front surface of the cover;
- a rear opening formed in the rear surface of the cover; and
- a connecting pipe passing through the cover to connect the front opening and the rear opening.

4. The refrigerator of claim 3, wherein the microphone hole vertically extends downward from a central portion of the connecting pipe and forms a cross section having a T shape with the voice input hole.

5. The refrigerator of claim 2, wherein the microphone is provided as a pair of microphones to correspond to the pair of voice input holes and disposed parallel to the voice input hole to be vertically connected to the microphone hole.

6. The refrigerator of claim 5, wherein the sealing member is provided as a pair of sealing members to correspond to the pair of microphones, and wherein the substrate includes a pair of microphone supports configured to support the pair of microphones and a pair of sealing member attachment parts to which the pair of sealing members are attached.

7. The refrigerator of claim 6, wherein the pair of sealing members and the substrate include first through holes and second through holes passing through the pair of sealing members and the substrate so that voice data input through the microphone holes is transmitted to the pair of microphones.

8. The refrigerator of claim 7, wherein the pair of sealing members are formed of a rubber material or poron tape.

9. The refrigerator of claim 8, wherein the pair of sealing members are in close contact with the substrate to prevent loss of the voice data input to the microphones through the second through holes.

10. The refrigerator of claim 9, wherein the substrate is fixed to the cover using a pair of screws so that the substrate is in close contact with the pair of sealing members.

11. The refrigerator of claim 10, wherein each of the substrate and the cover include a pair of first fastening holes and a pair of second fastening holes to which the pair of screws are fastened.

12. The refrigerator of claim 9, wherein the sealing member includes a waterproof member formed of a mesh or waterproof material so that water or foreign matter is prevented from entering the microphone through the second through hole.

13. The refrigerator of claim 6, wherein the sealing member includes a double-sided tape configured to attach the sealing member to a sealing member attachment part of the pair of sealing member attachment parts.

14. The refrigerator of claim 1, wherein the microphone is supported by a microphone support formed on a lower surface of the substrate, wherein the sealing member is attached to a sealing member attachment part formed on an upper surface of the substrate, wherein the substrate is coupled to the cover, wherein the cover is coupled to the cap door, and wherein the cap door cover is coupled to the upper portion of the cap door.

* * * * *